US005402497A

United States Patent [19]

Nishimoto et al.

[11] Patent Number: 5,402,497

[45] Date of Patent: Mar. 28, 1995

[54] HEADPHONE APPARATUS FOR REDUCING CIRCUMFERENCE NOISE

[75] Inventors: Hirofumi Nishimoto, Kanagawa; Kensaku Abe, Saitama; Eiji Sato; Nobuo Kobayashi, both of Tokyo, all of Japan

[73] Assignee: Sony Corporation, Tokyo, Japan

[21] Appl. No.: 92,865

[22] Filed: Jul. 19, 1993

[30] Foreign Application Priority Data

Aug. 19, 1992 [JP] Japan .................................. 4-220398

[51] Int. Cl.[6] .......................... H04R 3/00; H04R 1/10; H04B 15/00

[52] U.S. Cl. .......................................... 381/95; 381/94; 381/74

[58] Field of Search ........................ 381/71, 94, 74, 95, 381/25, 122

[56] References Cited

U.S. PATENT DOCUMENTS

| | | | |
|---|---|---|---|
| 4,455,675 | 6/1984 | Bose et al. | 381/71 |
| 4,503,553 | 3/1985 | Davis | 381/24 |
| 4,953,217 | 8/1990 | Twiney et al. | 381/71 |
| 5,182,774 | 1/1993 | Bourk | 381/74 |
| 5,276,740 | 1/1994 | Inanaja et al. | 381/72 |

FOREIGN PATENT DOCUMENTS

| | | | |
|---|---|---|---|
| 0208389 | 1/1987 | European Pat. Off. . | |
| 3627002 | 2/1988 | Germany | 381/71 |
| 4011704 | 10/1991 | Germany . | |
| 0096199 | 4/1991 | Japan | 381/94 |
| WO8400274 | 1/1984 | WIPO . | |

*Primary Examiner*—Curtis Kuntz
*Assistant Examiner*—Ping W. Lee
*Attorney, Agent, or Firm*—Jay H. Maioli

[57] ABSTRACT

A headphone apparatus includes a speaker unit accommodated in an accommodating member of an open-air type, a microphone disposed at a front side of the speaker unit, a circuit arrangement mounted on a circuit board in the speaker unit including a filter for lowering a level of a high frequency component of a signal picked up by the microphone, and a negative feedback loop for feeding back an output of the filter to the speaker unit to thereby lower the level of a low frequency component of circumference noise output from the speaker unit. This headphone apparatus further includes an equalizer having a frequency characteristic substantially opposite to that of the filter, wherein an input audio signal is added to the negative feedback loop through the equalizer and then output from the speaker unit.

2 Claims, 5 Drawing Sheets

Frequency Characteristic of Equalizer

Frequency Characteristic of Filter

Frequency Characteristic of Speaker Unit

Total Frequency Characteristic

HEADPHONE APPARATUS FOR REDUCING CIRCUMFERENCE NOISE

BACKGROUND OF THE INVENTION

1. Field of the Invention

The present invention generally relates to headphone apparatus and, more particularly, is directed to a headphone apparatus for reducing the circumference noise from the outside.

2. Description of the Related Art

In recent years, a headphone apparatus has been developed which has a function of electrically shielding the circumference noise from the outside. In such a headphone apparatus, a microphone is provided at the rear side of each of a pair of miniature speaker units placed over the right and left ears, and an audio signal picked up by the microphone is inverted in its phase and fed back to the input side of the corresponding speaker unit which thereby reproduces the audio signal. According to the thus constituted headphone apparatus, the audio signal thus fed back in opposite phase and reproduced by the speaker unit cancels sound transmitted to the ears from the outside, so that a person is prevented from hearing the circumference noise of the outside.

In the thus constituted headphone apparatus for shielding the circumference noise, however, since the microphone for picking up the signal to be fed back is provided at the rear side of the speaker unit, the microphone may pick up noise other than sound transmitted to the ear, for example, the sound of wind caused by movement of an object such as a hand near the ear. In this case, the phase of the feedback signal is not completely opposite to that of the sound transmitted to the ear from the outside due to the above-mentioned noise picked up by the microphone, so that undesirable sound is reproduced from the speaker unit and transmitted to the ear disadvantageously.

In order to obviate this problem, there has been developed a closed type headphone apparatus called a pressure type headphone apparatus in which a microphone for picking up the feedback signal is provided at the front side of the speaker unit. In the thus constituted closed type headphone apparatus, the space between the ear and the speaker unit is shielded from the outside by means of an ear pad with a good sound insulation efficiency, and the microphone for picking up the feedback signal is disposed within the shielded space. Therefore, since the microphone does not pick up undesirable external noise, only the circumference noise transmitted to the ear from the outside is fed back to the speaker unit and so the external circumference noise can be shielded efficiently.

However, when the thus constituted closed type headphone apparatus is configured as a headphone apparatus for shielding the external circumference noise, there is then the problem that the headphone apparatus can not be used for a long period of time. That is, since the closed type headphone apparatus is used in a state that the space between the ear and the speaker unit is shielded from the outside by means of the ear pad, the ear pad is urged or pressed against the ear side with a relatively large force. As a result, the feeling of the attachment of the headphone apparatus is not good and so it is difficult to continuously use the headphone apparatus for a long period of time. Further, when the closed type headphone apparatus is constructed as the headphone apparatus for shielding the external circumference noise to thereby completely shield the circumference noise, words spoken by a person around the headphone apparatus can not be heard at all, which can be dangerous depending on where the headphone apparatus is used.

If the headphone apparatus for shielding the circumference noise is used in an airplane, the pilot cannot hear an engine sound during the flight. The use of the closed type headphone apparatus is not preferable since it is difficult to continuously use the closed type headphone apparatus for a long period of time such as for a flight of several hours due to the unfavorable feeling thereof. Further, since sound such as an alarming sound broadcasted in the airplane is shielded by the use of the headphone apparatus for shielding the circumference noise, upon occurrence of an emergency, a reaction to the emergency may be delayed due to the usage of the headphone apparatus, which is an important problem in safety.

OBJECTS AND SUMMARY OF THE INVENTION

Therefore, it is an object of the present invention to provide an improved headphone apparatus for reducing the circumference noise in which the aforementioned shortcomings and disadvantages encountered with the prior art can be eliminated.

More specifically, it is an object of the present invention to provide a headphone apparatus for reducing circumference noise which can not only provide feeling of attachment sufficient for a person to use for a long period of time but which can transmit a minimal amount of external sound to the ears of a person using the headphone apparatus.

As an aspect of the present invention, there is provided a headphone apparatus which includes a speaker unit accommodated in an accommodating member of an open-air type, a microphone disposed at a front side of the speaker unit, a filter for lowering a level of a high frequency component of a signal picked up by the microphone, and a negative feedback loop for feeding back an output of the filter to the speaker unit to thereby lower a level of a low frequency component of circumference noise output from the speaker unit.

As another aspect of the present invention, there is provided a headphone apparatus which includes a speaker unit accommodated in an accommodating member of an open-air type, a microphone disposed at a front side of the speaker unit, a filter for lowering a level of a high frequency component of a signal picked up by the microphone, a negative feedback loop for feeding back an output of the filter to the speaker unit, and an equalizer having a frequency property substantially opposite to that of the filter, wherein an input audio signal is added to the negative feedback loop through the equalizer and then output from the speaker unit.

In this respect, a headphone apparatus preferably further includes a through circuit for supplying the input audio signal directly to the speaker unit when a voltage of a power supply for driving a driving circuit of the speaker unit decreases below a predetermined value.

According to the thus constituted headphone apparatus, since the headphone apparatus is constituted as an open-air type and further the signal to be fed back to the speaker unit is lowered in its level of a high frequency component by the filter, not only good feeling of attachment of the headphone apparatus is obtained and a person can use the headphone apparatus for a long period of time without being tired but also sound of a relatively high frequency component such as speech is not canceled by the feedback signal. As a consequence, a person using the headphone apparatus can hear a minimal amount of sound.

Furthermore, according to the present invention, the headphone apparatus is constituted as an open-air type, and the circuit arrangement of the headphone apparatus is configured in a manner that the filter is constituted to lower its input level of a high frequency component and the input audio signal is added, through the equalizer having a substantially opposite frequency characteristic to that of the filter, to the signal to be fed back to and then output from the speaker unit. As a result, the input audio signal is output from the speaker unit with the frequency characteristic thereof being kept substantially flat, while not only sound such as music or the like is reproduced satisfactorily but also circumference noise other than sound of relatively high frequency band such as speech is canceled by the feedback signal, so that a person can satisfactorily listen to the input audio signal such as music without being disturbed by circumference noise.

In this respect, the present invention provides the through circuit for directly supplying the input audio signal to the speaker unit when a voltage of the power supply for driving the driving circuit of the speaker unit decreases below the predetermined value. Therefore, when the canceling operation of the circumference noise by the headphone apparatus does not operate due to the decrease of the output voltage of the power supply, the headphone apparatus according to the present invention can be used as the ordinary headphone apparatus for reproducing the input audio signal.

The preceding and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENTS

A headphone apparatus according to an embodiment will now be described with reference to FIG. 1 to FIGS. 5A through 5D, in which case, the present invention is applied to a headphone apparatus used within a vehicle such as an airplane or the like.

Figure 2:
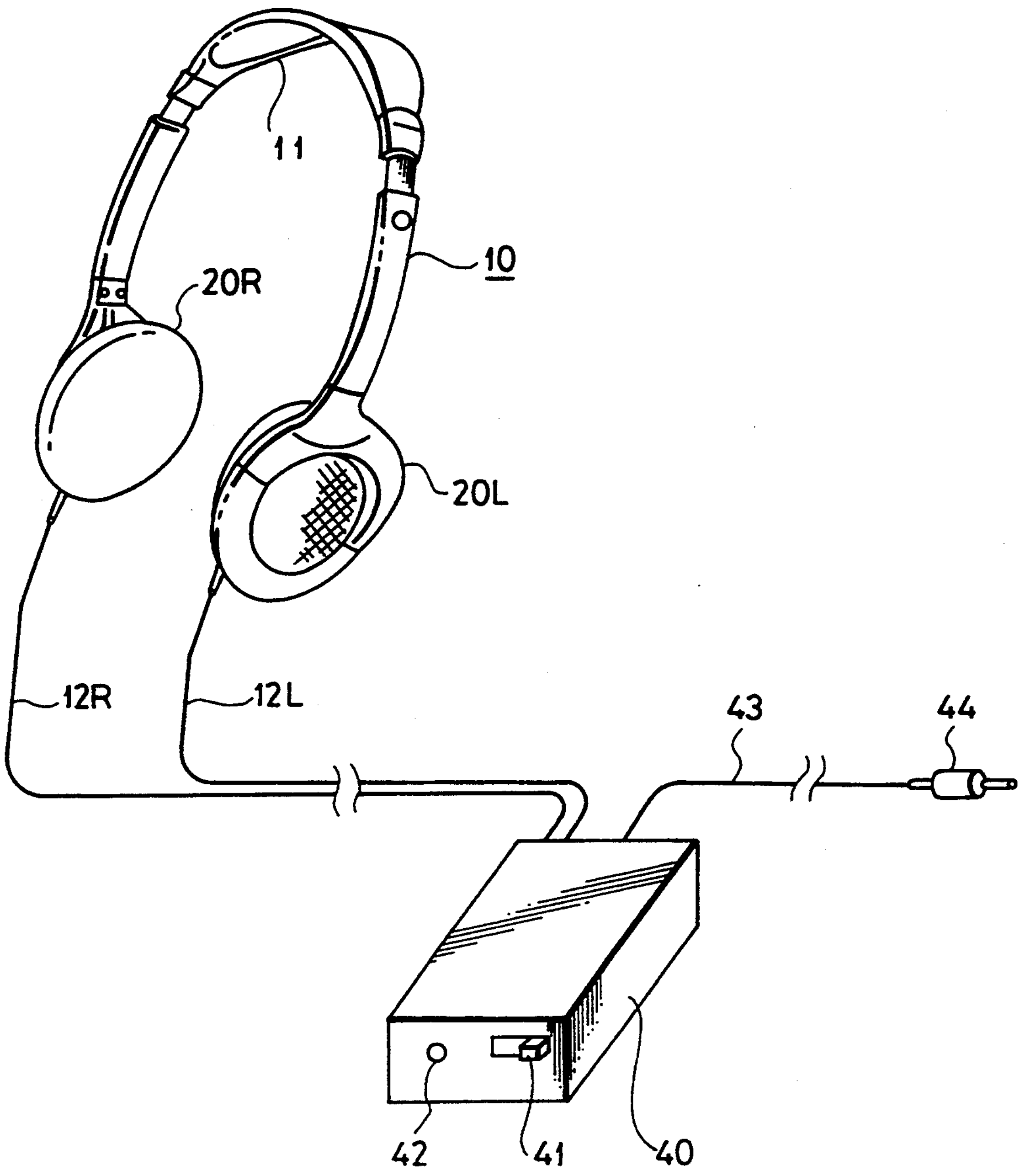
FIG. 2 is a schematic diagram generally illustrating a headphone apparatus according to the embodiment.

FIG. 2 generally shows an arrangement of the headphone apparatus of the embodiment of the present invention. Referring to FIG. 2, the headphone apparatus 10 is made by attaching right and left speaker devices 20R and 20L to a headband 11. Each of the speaker devices 20R and 20L is arranged to constitute a so-called open-air type headphone. Signal lines 12L and 12R are respectively led out from the speaker devices 20L and 20R and connected to a battery case 40, so that electric power for driving the speaker devices is supplied from a battery contained in the battery case 40 to the speaker devices 20L and 20R. The battery case 40 is provided with a power supply switch 41 and a pilot lamp 42. A plug 44 is attached to an end of a signal line 43 led out from the battery case 40. The plug 44 is connected to a stereo audio signal output jack mounted at each passenger seat. An audio signal provided from the stereo audio signal output terminal is supplied to the left and right speaker devices 20L and 20R through the signal line 43 and the signal lines 12L and 12R, respectively, to thereby reproduce the audio signal from speaker units contained in the speaker devices 20L and 20R. Each of the signal lines 12L and 12R contains an audio signal transmission line and a power supply line.

Figure 3:
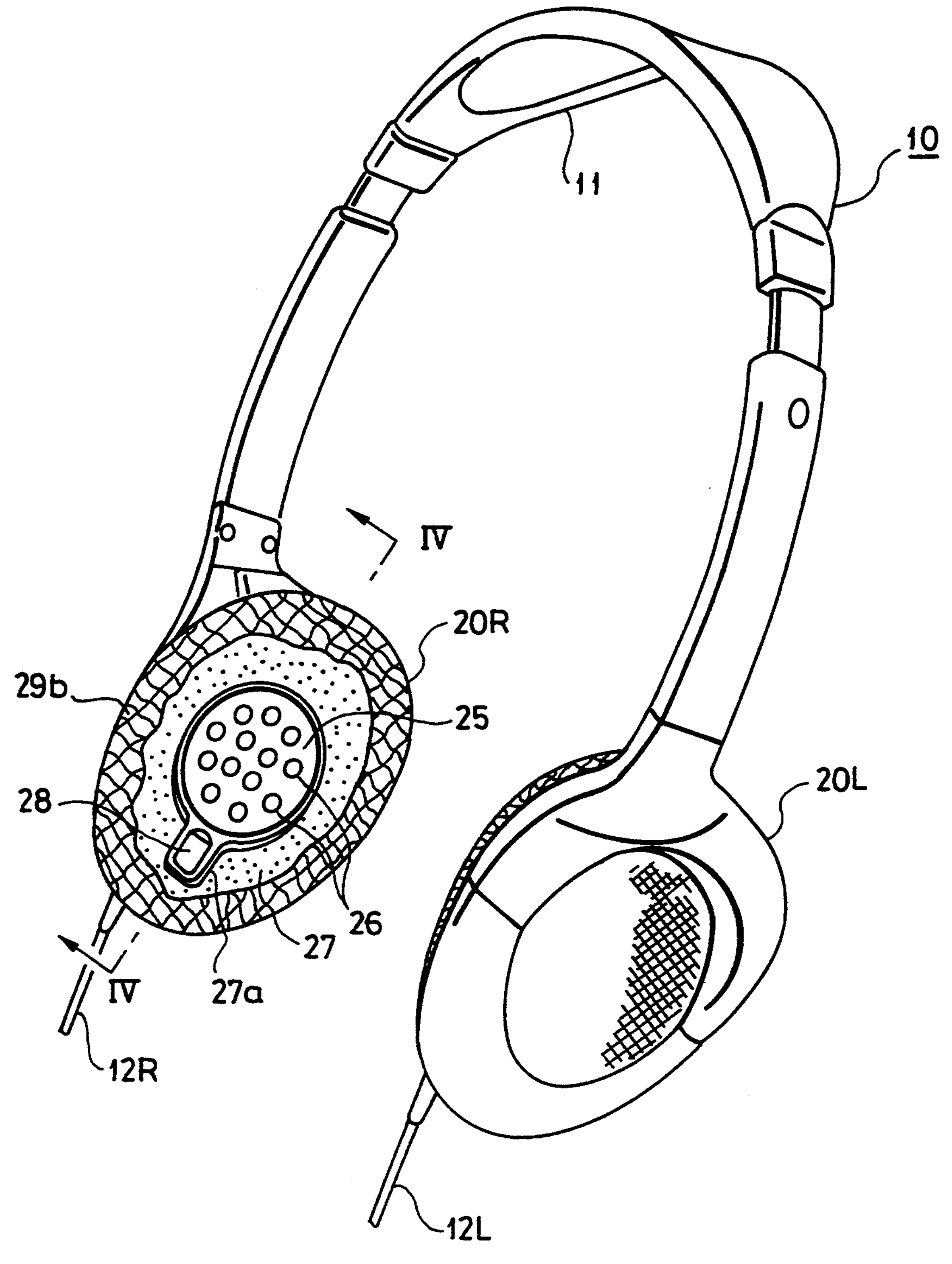
FIG. 3 is a schematic perspective view illustrating the headphone apparatus according to the embodiment.
Figure 4:
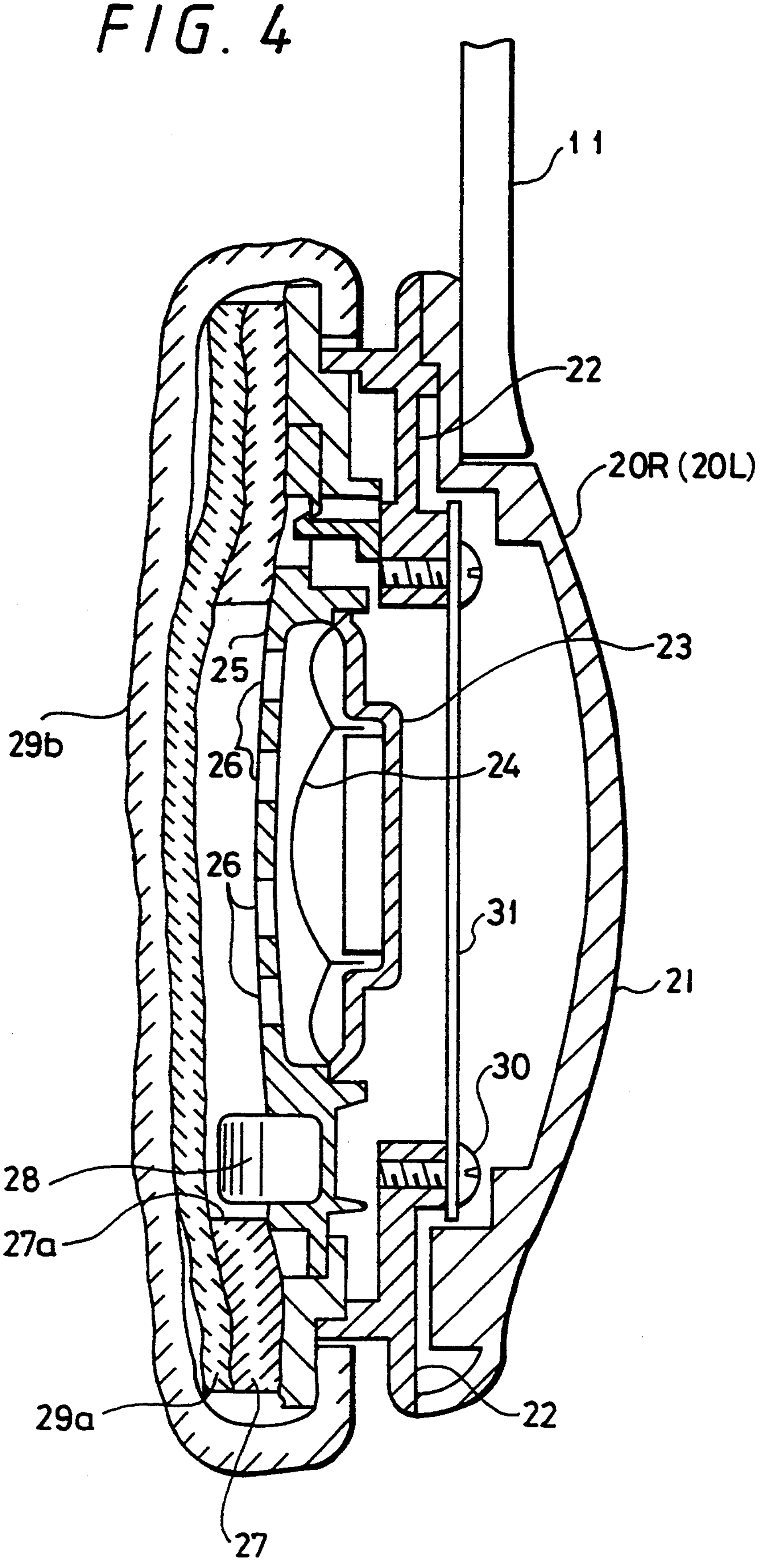
FIG. 4 shows a schematic sectional view of the headphone apparatus according to the embodiment taken along a line IV—IV of FIG. 3.

Each of the speaker devices 20L and 20R is constituted as shown in FIGS. 3 and 4. Referring to FIG. 4, a pair of cases 21 and 22 formed by synthetic resin are bonded to form a housing. A miniature speaker unit 23 is disposed almost at the center portion of the housing. A diaphragm 24 attached to the speaker unit 23 is driven or vibrated by a magnetic circuit (not shown) such as a voice coil or the like to thereby generate a sound wave. The sound wave thus generated is transmitted to a front side of the speaker device through through-holes 26 bored through a protector 25 provided at the front side of the diaphragm. As shown in FIG. 3, a highly sealed or airtight elastic material 27 of ring-like configuration is attached at the periphery portion of the front face of the protector 25. The elastic material 27 has a function of adjusting frequency characteristics of the headphone device. A miniature microphone 28 is disposed in a notch 27a provided at a lower portion of the elastic material 27. An omni- or non-directional microphone is used as the microphone 28, for example.

A cushion *29a* and an ear pad *29b* are attached to the front side of each of the speaker devices 20L and 20R so as to cover the microphone 28 and the elastic material 27. The cushion *29a* and the ear pad *29b* are each made of elastic material which is air permeable and has relatively low density such as sponge or the like so as not to prevent the transmission of the sound wave generated from the speaker unit 23. Owing to the cushion *29a*, not only is howling or acoustic feedback prevented but also the extent of feeling the headphone device when held over the ear can be improved. Since a cushion *29a* and an ear pad *29b* each having good air permeability are provided so as to cover the front side of each of the speaker devices 20L and 20R, the headphone apparatus 10 is constituted as an open-air type (that is, velocity type) headphone apparatus in which a space between the ear and the speaker unit 23 is not sealed. A circuit board 31, on which a circuit arrangement for canceling the circumference noise is mounted, is mounted at the rear side of the speaker unit 23 by screws 30.

Figure 1:
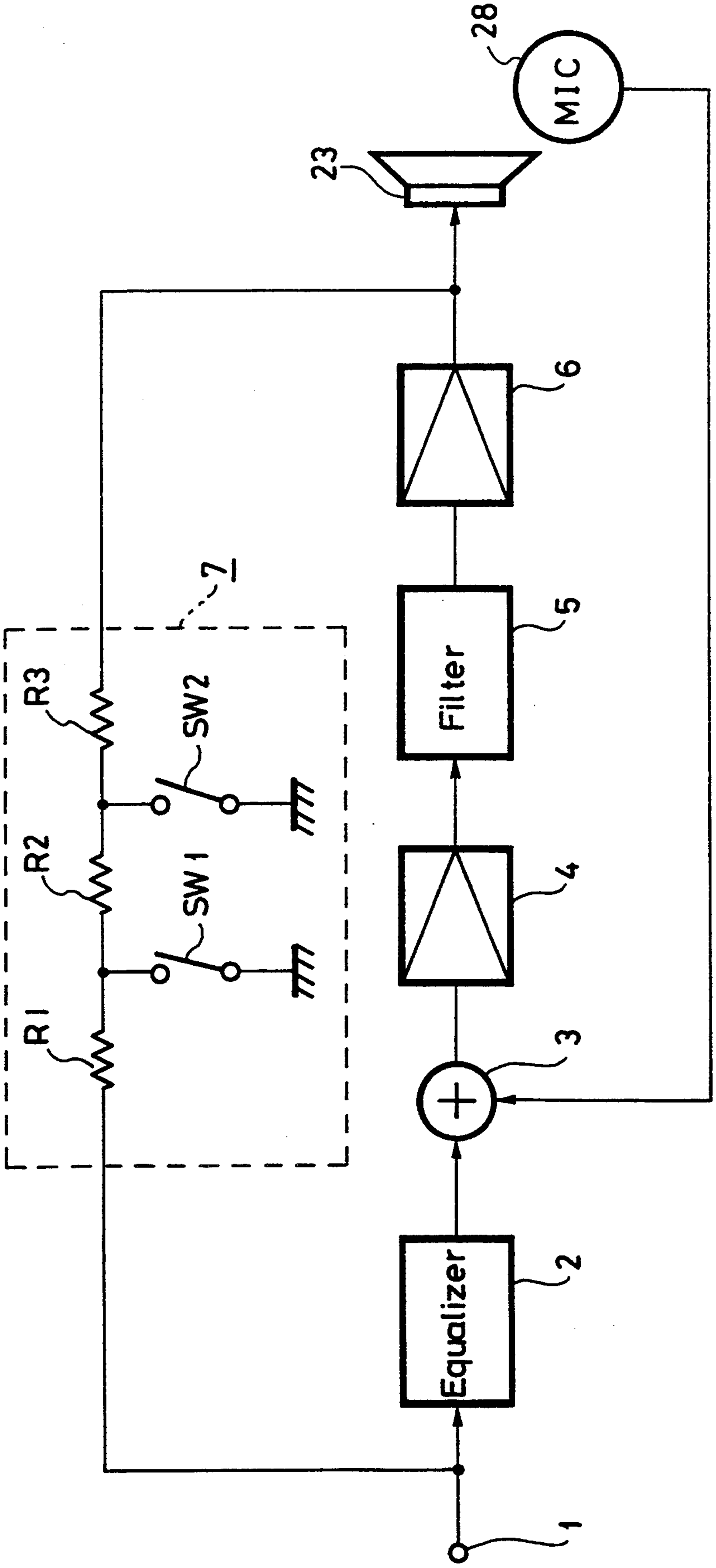
FIG. 1 shows in block form an arrangement for canceling circumference noise mounted in a headphone apparatus according to an embodiment of the present invention.
Figure 5A:
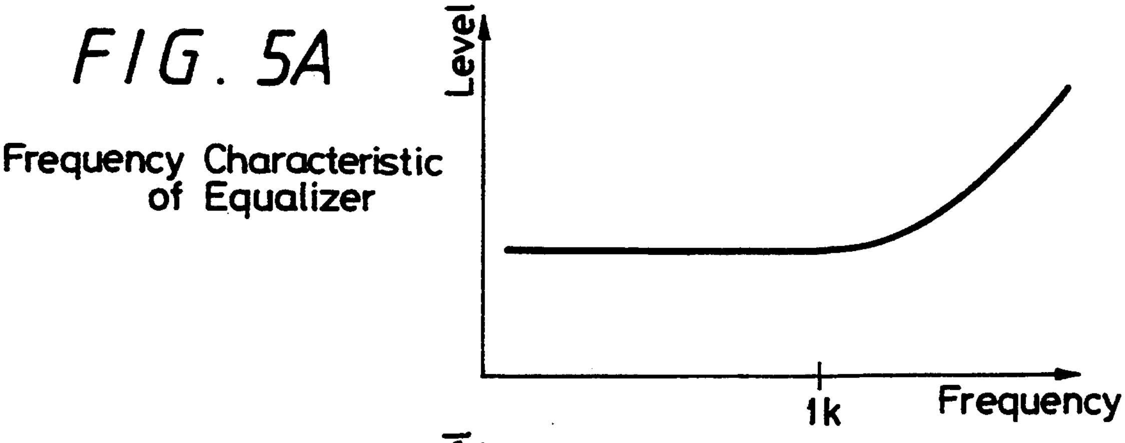
FIGS. 5A to 5D are schematic diagrams illustrating frequency characteristics at various portions of the circuit arrangement of FIG. 1, respectively.

A circuit arrangement of the headphone apparatus mounted on the circuit board 31 will be described with reference to FIG. 1. Referring to FIG. 1, an audio signal of a right or a left channel transmitted from an external audio device through the signal line 12R or 12L is supplied to an audio signal input terminal 1. The audio signal applied to the input terminal 1 is supplied to an adder 3 through an equalizer 2. The equalizer 2 is arranged so as to boost a frequency component of about 1 kHz or more of an input signal as shown in FIG. 5A so that its frequency characteristic is substantially opposite to that of a filter 5 which will be described later on.

Figure 5B:
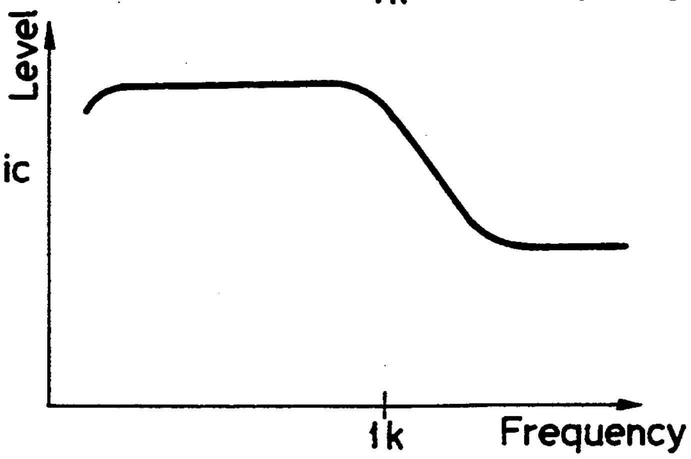

An audio signal picked up by the microphone 28 is also supplied to the adder 3 in which a sum of the audio signal from the microphone 28 and the output of the equalizer 2 are added to each other. In this case, the polarity of the audio signal from the microphone 28 is made opposite to that of the audio signal from the equalizer 2 upon addition. Then, an added signal from the adder 3 is applied to the filter 5 through an input amplifier 4. The filter 5 is arranged so as to lower the level of a frequency component of an input signal of about 1 kHz or more as shown in FIG. 5B so that its frequency characteristic is substantially opposite to that of the equalizer 2.

An output of the filter 5 is supplied to the speaker unit 23 through an output amplifier 6, so that the diaphragm 24 of the speaker unit 23 is vibrated in accordance with the audio signal from the output amplifier 6 to thereby output a sound. The circuits such as the input amplifier 4, the output amplifier 6 or the like requiring a power supply to be operated are supplied with electric power through the signal lines 12R and 12L from the battery case 40.

The audio signal applied to the input terminal 1 is also supplied to the speaker unit 23 through a through circuit 7. The through circuit 7 is composed of resistors R1, R2 and R3 connected in series wherein the audio signal from the input terminal 1 is applied to the resistor R1 side and an audio signal output from the resistor R3 side is applied to the speaker unit 23. A connection point between the resistors R1 and R2 is grounded through a switch SW1 and a connection point between the resistors R2 and R3 is grounded through a switch SW2. The switches SW1 and SW2 are controlled in accordance with a voltage of the power supply supplied from the battery case 40 through the signal line 12L or 12R. That is, each of the speaker devices 20L and 20R has a detection circuit (not shown) for detecting the voltage of the power supply (battery) supplied from the battery case 40. Each of the switches SW1 and SW2 is placed in an opened or disconnected state when the detection circuit detects that the voltage of the power supply decreases to a level difficult to operate the respective circuits.

Each of the switches SW1 and SW2 is a semiconductor switch maintained in the disconnected state when a voltage sufficient for operating the switches is not obtained.

Since the through circuit 7 is composed as mentioned above, when each of the switches SW1 and SW2 is in a closed or connected state, the through circuit 7 operates so as to electrically disconnect the path between the input terminal 1 and the speaker unit 23, so that the audio signal applied to the input terminal 1 is supplied to the speaker unit 23 through a path from the equalizer 2 to the output amplifier 6. In contrast, when each of the switches SW1 and SW2 is in the disconnected state, the speaker unit 23 is directly connected to the input terminal 1 through the resistors R1, R2 and R3.

In this embodiment, the circuit arrangement of FIG. 1 is incorporated in the right and left speaker devices 20R and 20L, so that two sets of the circuit arrangement of FIG. 1 are provided, one for the right and one for the left speaker device of one headphone apparatus.

Operation of the headphone apparatus according to the embodiment will be described. First, operation will be made in a case where the headphone apparatus is supplied with a voltage from the power supply (battery) of the battery case 40, sufficient for operating the apparatus, that is, a case where a voltage of the power supply for driving the driving circuit of the speaker unit is not below a predetermined value. In this case, the audio signal from the input terminal 1 is prevented from passing through the through circuit 7 since both the switches SW1 and SW2 are closed. The audio signal from the input terminal 1 is added to the audio signal picked up by the microphone 28 at the adder 3, and the added audio signal from the adder 3 is output from the speaker unit 23. Since the microphone 28 is disposed in front of the speaker unit 23, the circumference noise transmitted to ears of a person using the headphone apparatus 10 is canceled by a signal output from the speaker unit 23 having opposite phase to that of the circumference noise. Therefore, the circumference noise is not transmitted to the ears of the person using the headphone apparatus 10.

In this regard, since the signal fed back from the microphone 28 to the speaker unit 23 is passed through the filter 5 for lowering a level of the higher frequency component of about 1 kHz or more, the fed-back signal has only a relatively lower frequency component lower than 1 kHz, so that the circumference noise of only a frequency component lower than 1 kHz is canceled by the output signal from the speaker unit 23. Thus, circumference sound of a relatively high frequency such as speech, alarm sound or the like can be heard by a person even if the person uses the headphone apparatus 10. For example, even if the person uses the headphone apparatus 10, since the person can immediately judge a circumference state, the safety of the person can be ensured. Further, rasping circumference noise of a relatively low frequency such as engine sound of an airplane can be effectively removed by the circuit arrangement of the embodiment.

Figure 5C:
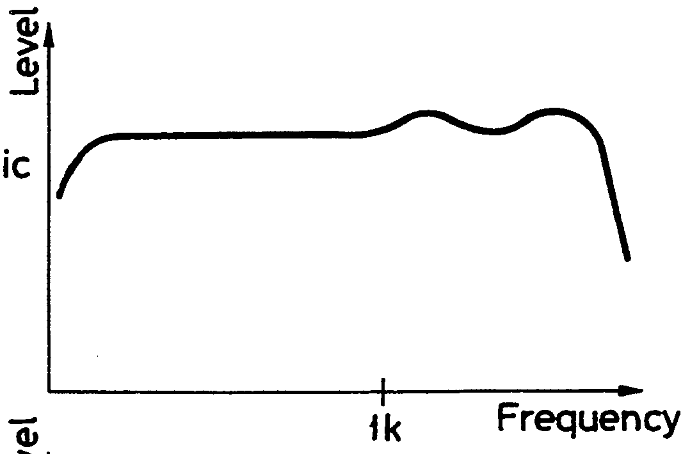
Figure 5D:
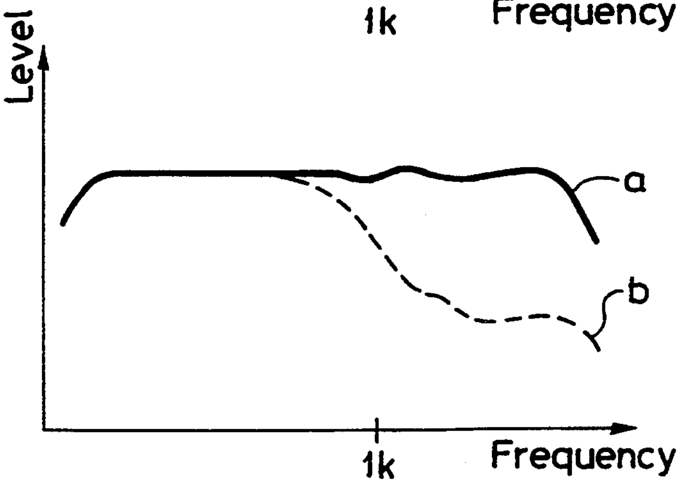

The audio signal applied to the input terminal 1 is boosted in its high frequency component by the equalizer 2 and then lowered in its high frequency component by the filter 5 having a frequency characteristic substantially opposite to that of the equalizer 2, so that the entire frequency characteristic of the circuit arrangement from the equalizer 2 to the speaker unit 23 of FIG. 1 is substantially flat. That is, when the frequency characteristics of the equalizer 2, the filter 5 and the speaker unit 23 are set as shown in FIGS. 5A, 5B and 5C, respectively, the entire frequency characteristic of the circuit arrangement of FIG. 1 will be substantially flat over an entire audio reproduction frequency band as shown by a curve a in FIG. 5D. In contrast, only the signal fed back from the microphone 28 to the speaker unit 23 is lowered in its high frequency component of almost 1 kHz or more as shown by a dotted line b in FIG. 5D.

Accordingly, since an audio signal such as music or the like applied to the input terminal 1 is reproduced in a state where the circumference noise of a lower frequency component is eliminated, a person can hear an audio signal such as music or the like with the influence of circumference noise being eliminated even if the person uses the headphone apparatus in a vehicle with a large noise level such as an airplane. Consequently, the person can satisfactorily hear an audio signal such as music and so forth even if a sound volume of a reproduced signal is made relatively small. Thus, harmful effects on to the auditory senses can be minimized even if the person uses the headphone apparatus for a long period of time with a large sound volume.

Since the headphone apparatus 10 according to the embodiment is an open-air type, a pressure (side pressure) applied around the ears of a person using the headphone apparatus 10 is relatively small, so that the feeling of attachment of the headphone apparatus 10 is minimal and a person using the headphone apparatus 10 will not be tired even if it is attached for a long period of time. In this case, since the peripheral portion of the microphone 28 for obtaining the signal to be fed back is covered by the highly sealed or airtight elastic material 27, the signal to be fed back can be picked up by the microphone 28 with good efficiency. As a result, the headphone apparatus of the embodiment can attain efficiency substantially the same as a headphone apparatus for shielding circumference noise which is constituted by a closed type headphone apparatus. The highly sealed or airtight elastic material 27 may be made of a hard material such as synthetic resin or the like, but in this case feeling of the attachment of the headphone apparatus will be degraded slightly.

When a voltage supplied to the headphone apparatus 10 becomes an insufficient value for operating the apparatus due to the consumption of the power supply (battery) in the battery case 40, that is, when a voltage of the power supply for driving the driving circuit of the speaker unit decreases below the predetermined value, the switches SW1 and SW2 are opened. As a consequence, the circumference noise is not eliminated, but the audio signal applied to the input terminal 1 is supplied to the speaker unit 23 through the through circuit 7, so that the audio signal can be reproduced in the same manner as the ordinary headphone apparatus. Accordingly, even if the power supply is consumed, the audio signal applied to the input terminal 1 through the plug 44 (FIG. 2) from the external audio device can be output from the speaker unit 23, and so a person can surely hear sound such as an announcement or the like in a vehicle, for example.

While, in the above-described embodiment, the signal to be fed back from the microphone 28 is added to the audio signal from the input terminal 1 at the preceding stage of the filter 5, the present invention may be modified in a manner such that only the signal to be fed back from the microphone 28 is input to the filter 5 and the audio signal from the input terminal 1 is added to the output signal of the filter 5 at the rear stage thereof. In this case, however, the frequency characteristic of the equalizer 2 is required to be changed slightly. Further, although, in the foregoing embodiment, the phase of the signal to be fed back is inverted upon the adding operation of the adder 3, the phase inversion operation may be performed by another circuit. Furthermore, although, in the foregoing embodiment, the filter 5 is arranged so as to lower the level of the frequency component of the input signal of about 1 kHz or more, the filter 5 may be arranged so as to lower a level of the frequency component of another frequency band, for example, 2 kHz or more.

Further, although, in the foregoing embodiment, the audio signal is fed into the input terminal 1 through the plug 44 from the external audio device, the circuit arrangement of FIG. 1 may be modified in a manner that the input terminal 1, equalizer 2, adder 3, and through circuit 7 are removed so that the headphone apparatus serves as a circuit merely for removing the circumference noise.

Further, while, in the aforementioned embodiment, the headphone apparatus 10 is supplied With electric power from the battery case 40 connected between the headphone apparatus 10 and the plug 44, a battery may be accommodated within the headphone apparatus or electric power may be supplied from the plug 44 side. In the latter case, additional transmission lines for supplying electric power may be provided independent of the signal lines for the audio signal or electric power may be transmitted through the signal lines by superimposing it on the audio signal.

Furthermore, the headphone apparatus may be miniaturized by incorporating the circuits such as the filter, the equalizer or the like in the battery case or the external audio device.

Furthermore, while, in the aforementioned embodiment, the headphone apparatus is constituted so as to be used in a vehicle such as an airplane or the like, the headphone apparatus is not limited thereto and may be used in various states.

As set out above, according to the present invention, since the headphone apparatus is an open-air type and further the signal to be fed back to the speaker unit is lowered in its level of a high frequency component by the filter, not only is good feeling of attachment of the headphone apparatus obtained and not only can a person use the headphone apparatus for a long period of time without being tired but also sound of a relatively high frequency component such as speech or the like is not canceled by the feedback signal. As a consequence, a person using the headphone apparatus can hear sound at a required minimum level to thereby ensure the safety of the person.

Furthermore, according to the present invention, the headphone apparatus is an open-air type, and the circuit arrangement of the headphone apparatus is configured in a manner such that the filter lowers the input level of a high frequency component and the input audio signal is added, through the equalizer having a frequency characteristic substantially opposite to that of the filter, to the signal to be fed back and then output from the speaker unit. As a result, the input audio signal is provided from the speaker unit with the frequency characteristic thereof being kept substantially flat, while circumference noise other than sound of relatively high frequency band such as speech or the like is canceled by the feedback signal, so that a person can satisfactorily hear the input audio signal such as music or the like without being disturbed by circumference noise.

In this respect, the present invention provides the through circuit for directly supplying the input audio signal to the speaker unit when a voltage of the power supply for driving the driving circuit of the speaker unit decreases below the predetermined value. Therefore, when the canceling operation of the circumference noise by the headphone apparatus does not operate due to the decrease of the output voltage of the power supply, the headphone apparatus according to the present invention can be used as the ordinary headphone apparatus for reproducing the input audio signal, so that the input audio signal can be continuously reproduced without being interrupted.

Having described the preferred embodiment of the invention with reference to the accompanying drawings, it is to be understood that the invention is not limited to the precise embodiment and that various changes and modifications thereof could be effected by one skilled in the art without departing from the spirit or scope of the invention as defined in the appended claims.

What is claimed is:

1. A headphone apparatus comprising:

a pair of open-air speaker housings; and a pair of speaker devices disposed respectively in said pair of open-air speaker housings, each of said pair of speaker devices including a speaker unit;

a microphone disposed at a front side of said speaker unit;

an equalizer receiving an input audio signal for boosting high frequency components thereof; and a negative feedback loop connected for feeding back a signal picked up by said microphone to said speaker unit to thereby lower a level of a low frequency component of circumference noise output from said speaker unit, wherein said negative feedback loop includes an adder for adding the signal picked up by said microphone to an output signal from said equalizer and producing an added signal;

a filter for attenuating high frequency components of the added signal fed thereto from said added; and means for inverting a phase of the filtered added signal fed to said speaker unit relative to a phase of the signal picked up by said microphone.

2. A headphone apparatus according to claim 1, further comprising a power supply for supplying a voltage to said pair of speaker devices; and a through circuit for supplying the input audio signal directly to said speaker unit when the voltage of said power supply decreases below a predetermined value.

* * * * *